US011488436B2

(12) United States Patent
Robinson

(10) Patent No.: US 11,488,436 B2
(45) Date of Patent: Nov. 1, 2022

(54) COMPUTERIZED LOCKER BANKS WITH ENHANCED FORECASTING CAPABILITIES

(71) Applicant: United Parcel Service of America, Inc., Atlanta, GA (US)

(72) Inventor: Kalin Robinson, Johns Creek, GA (US)

(73) Assignee: UNITED PARCEL SERVICE OF AMERICA, INC., Atlanta, GA (US)

(*) Notice: Subject to any disclaimer, the term of this patent is extended or adjusted under 35 U.S.C. 154(b) by 600 days.

(21) Appl. No.: 15/861,280

(22) Filed: Jan. 3, 2018

(65) Prior Publication Data
US 2018/0190062 A1 Jul. 5, 2018

Related U.S. Application Data

(60) Provisional application No. 62/441,832, filed on Jan. 3, 2017.

(51) Int. Cl.
G07F 17/12 (2006.01)
G06Q 10/08 (2012.01)
G06F 21/62 (2013.01)

(52) U.S. Cl.
CPC ............ *G07F 17/13* (2020.05); *G06F 21/62* (2013.01); *G06Q 10/0836* (2013.01); *G06Q 10/0838* (2013.01)

(58) Field of Classification Search
CPC ..... G06F 17/13; G06F 21/62; G06Q 10/0832; G06Q 10/0838
(Continued)

(56) References Cited

U.S. PATENT DOCUMENTS

2002/0177922 A1* 11/2002 Bloom ................ G06Q 20/00
700/213
2004/0177008 A1 9/2004 Yang
(Continued)

FOREIGN PATENT DOCUMENTS

CA 2846273 A1 * 9/2014 ......... G06Q 30/0282

OTHER PUBLICATIONS

Savin, Sergei V et al. "Capacity Management in Rental Businesses with Two Customer Bases." Operations research 53.4 (2005): 617-631. Web. (Year: 2005).*
(Continued)

*Primary Examiner* — Akiba K Robinson
(74) *Attorney, Agent, or Firm* — Shook, Hardy & Bacon L.L.P.

(57) ABSTRACT

Computerized locker banks and related computing systems, according to various embodiments, are adapted to track consignee-specific and non-consignee-specific data regarding the pickup of parcels from particular locker banks (or other alternate delivery locations) and to use that information to forecast inventories for the particular locker banks over time. For example, the system may use this information, and/or other suitable information, to generate a set of projected inventories for a particular locker bank for each sequential two-hour block of time on a particular day. This information may be used to determine which locker bank to route a particular parcel to. This may be especially useful in the context of "not-in-one" deliveries in which a delivery driver unsuccessfully attempts to deliver a parcel to a consignee's primary delivery address and the parcel is re-routed to a locker bank or other alternative delivery location for later pickup by the consignee.

21 Claims, 6 Drawing Sheets

(58) Field of Classification Search
USPC ......... 705/28, 330, 332, 333, 337, 339, 341, 705/7.11
See application file for complete search history.

(56) References Cited

U.S. PATENT DOCUMENTS

| | | | |
|---|---|---|---|
| 2011/0208725 A1* | 8/2011 | Owens | G06Q 10/063 707/723 |
| 2014/0330407 A1* | 11/2014 | Corder | G05B 15/02 700/90 |
| 2015/0106291 A1 | 4/2015 | Robinson et al. | |
| 2015/0106292 A1 | 4/2015 | Robinson et al. | |
| 2015/0106294 A1 | 4/2015 | Robinson et al. | |
| 2015/0106296 A1 | 4/2015 | Robinson et al. | |
| 2015/0186840 A1* | 7/2015 | Torres | A47F 10/02 705/339 |
| 2018/0033235 A1* | 2/2018 | Dotterweich | G07C 9/00896 |
| 2018/0060800 A1 | 3/2018 | Robinson | |
| 2018/0190054 A1 | 7/2018 | Perez et al. | |

OTHER PUBLICATIONS

Non Final Office Action received for U.S. Appl. No. 15/608,781, dated Feb. 6, 2018, 24 pages.

* cited by examiner

10am (Actual Inventory)

|   | 1 | 2 | 3 | 4 | 5 | 6 | 7 |
|---|---|---|---|---|---|---|---|
| A | X | X | X | X | X | X | X |
| B | X | X | X | X | X | X | X |
| C | X | X | X | X | X | X | X |
| D | X | X | X | X | X | A | X |

Fig. 4A

6pm – 8pm (Forecasted Inventory)

|   | 1 | 2 | 3 | 4 | 5 | 6 | 7 |
|---|---|---|---|---|---|---|---|
| A | A | X | X | X | X | X | X |
| B | A | X | X | X | X | X | X |
| C | X | X | X | A | X | X | X |
| D | X | X | A | X | X | X | X |

Fig. 4B

5pm (Actual Inventory)

|   | 1 | 2 | 3 | 4 | 5 | 6 | 7 |
|---|---|---|---|---|---|---|---|
| A | A | X | X | X | X | X | X |
| B | A | X | A | X | X | X | X |
| C | X | X | X | X | X | X | X |
| D | X | X | A | X | X | X | X |

Fig. 5A

6pm – 8pm (Updated Forecasted Inventory)

|   | 1 | 2 | 3 | 4 | 5 | 6 | 7 |
|---|---|---|---|---|---|---|---|
| A | A | X | X | X | X | X | X |
| B | X | X | X | X | X | X | X |
| C | X | X | X | A | X | X | X |
| D | X | X | Assigned | X | X | A | X |

Fig. 5B

COMPUTERIZED LOCKER BANKS WITH ENHANCED FORECASTING CAPABILITIES

CROSS-REFERENCE TO RELATED APPLICATIONS

This application claims the benefit of U.S. Application No. 62/441,832, filed Jan. 3, 2017, entitled "Computerized Locker Banks With Enhanced Forecasting Capabilities," under 35 U.S.C. § 119(e), which is incorporated in its entirety by reference herein.

BACKGROUND

Currently, when a carrier is unable to deliver a parcel to a particular address (e.g., because the recipient is not at home and it is not advisable to leave the parcel unattended at the particular address), the carrier typically skips delivery of the parcel and attempts to redeliver the parcel on another day. Such redelivery attempts may occur multiple times for a particular parcel, which results in increased transaction costs for the carrier (e.g., in the form of increased fuel expenses, additional manpower, etc.), and delays in the consignee receiving the parcel. To address this issue, after an unsuccessful delivery attempt, the parcel at issue may be scheduled to be delivered to an alternate delivery location, such as a locker bank or other alternate delivery location. However, since the inventory of particular locker banks and other alternate delivery locations is typically limited in nature, and since it may be difficult to predict when consignees will retrieve their items from alternate delivery locations, it may be difficult to predict whether a particular locker bank will have the capacity to receive a particular parcel. Accordingly, there is a need for improved alternate delivery locations (e.g., computerized locker banks or attended delivery locations) and related systems that provide enhanced forecasting of the availability of the alternate delivery locations to handle particular parcel deliveries at respective predicted delivery times.

SUMMARY

In various embodiments, a computerized locker network comprises: (1) a plurality of locker banks; (2) a plurality of portable computing devices (e.g., handheld computing devices such as smartphones or tablet computers); and (3) one or more remote logistics servers. Each one of the plurality of locker banks comprises: (i) one or more locker bank computers comprising one or more processors and memory; and (ii) one or more selectively securable locker compartments comprising one or more doors and one or more locking mechanisms, wherein the one or more processors are configured to operate the one or more locking mechanisms to selectively unlock and/or open the one or more doors. Each one of the plurality of portable computing devices comprises: (i) one or more processors; and (ii) memory. The one or more logistics servers comprise (i) one or more processors; and (ii) memory operatively coupled to the one or more processors, wherein the memory is configured to store package level detail information and tracking information for a plurality of parcels, and the one or more processors are configured to selectively update the tracking information for the plurality of parcels.

The computerized locker network is configured for: (a) receiving, at the one or more logistics servers via one or more networks, identifying information for a particular parcel of the one or more parcels from a particular portable computing device of the plurality of portable computing devices following an unsuccessful delivery attempt of the particular parcel at a primary delivery location; (b) at least partially based on the received identifying information and package level detail information associated with the particular parcel, determining a first locker bank at a secondary location from the plurality of locker banks for the particular parcel; (c) forecasting, by the computerized locker network, an availability of one or more lockers at the first locker bank for a first particular time in the future; and (d) assigning, by the computerized locker network, the particular parcel to the first locker bank if a suitable locker is forecast to be available at the first particular time.

In various embodiments, forecasting an availability of one or more lockers at the first locker bank further comprises (a) determining, by the computerized locker network, the actual locker inventory at a second particular time that is earlier in time than the first particular time; and (b) at least partially based on a predicted behavior of one or more consignees having parcels presently stored in one or more lockers at the first locker bank, forecasting, by the computerized locker network, the availability of one or more lockers at the first particular time. In other embodiments, forecasting an availability of one or more lockers at the first locker bank further comprises: (a) determining, by the computerized locker network, the actual locker inventory at a third particular time, wherein the third particular time occurs after the second particular time, but before the first particular time; and (b) updating, by the computerized locker network, the forecasted availability of one or more lockers at the first locker bank based at least in part on the actual locker inventory at the third particular time.

In yet other embodiments, forecasting an availability of one or more lockers at the first locker bank further comprises: (a) determining, by the computerized locker network, consignee information for one or more parcels currently stored at the first locker bank; (b) at least partially based on the consignee information for the one or more parcels currently stored at the first locker bank, predicting, by the computerized locker network, a pickup time of one or more of the parcels currently stored at the first locker bank; and (c) calculating, by the computerized locker network, a forecasted locker inventory availability at the first particular time.

In various embodiments, the computerized locker network is further configured for: (1) confirming at a second time prior to the first time whether a particular suitable locker is available at the first locker bank; (2) at least partially in response to confirming whether the particular suitable locker is available: (a) assigning the particular suitable locker at the first locker bank to the particular parcel if the particular suitable locker is available; (b) assigning, by a processor, an available locker at a second locker bank to the particular parcel if the particular suitable locker is not available; (c) arranging for a portable second locker bank to be delivered to the secondary location prior to the first time if the particular suitable locker is not available and assigning a suitable locker from the portable second locker bank to the particular parcel; or (d) rescheduling delivery of the particular parcel to the primary delivery location; and (3) thereafter notifying the consignee of the status of the parcel.

A computer-implemented method for directing one or more parcels to a suitable locker bank, in various embodiments, comprises: (a) receiving, by a processor, a first indication that delivery of one or more first parcels to a primary delivery location is not possible; (b) determining, by a processor, a first locker bank at a secondary location based at least in part on one or more first pieces of information selected from a first group consisting of: (i) consignee information; (ii) information associated with the one or more first parcels; (iii) carrier information; and (iv) projected locker availability; and (c) forecasting, by a processor, locker availability at a first time for the first locker bank based at least in part on one or more second pieces of information selected from a second group consisting of: (i) consignee information associated with one or more parcels currently at the first locker bank; (ii) a pick-up time of one or more parcels previously stored at the first locker bank; (iii) an average length of time that one or more parcels were left at the first locker bank prior to being picked up; (iv) a number of total lockers at the first locker bank; and (v) the size of the lockers available in the first locker bank; and (d) at least partially in response to forecasting locker availability at a first time for the first locker bank, assigning the one or more first parcels to the first locker bank. The first locker bank further comprises a plurality of locker compartments comprising a plurality of walls, one or more doors and a locking mechanism operatively coupled to the one or more doors. In various embodiments, the first locker bank further comprises one or more computers operatively coupled to the locking mechanism for each one of the plurality of locker compartments and a communication hub operatively coupled to the one or more computers where the communication hub is operatively configured to communicate with one or more remote logistic servers.

In various embodiments, a processor confirms whether a locker is available at the first locker bank at a second time prior to the first time. In response to confirming whether a locker is available, the system does one of the following: (1) assigns an available locker at the first locker bank to the first one or more parcels, (2) assigns an available locker at a second locker bank to the one or more parcels, (3) arranges for a portable second locker bank to be delivered to the secondary location prior to the first time and assigns a locker from the portable second locker bank to the first one or more parcels, or (4) reschedules delivery of the first one or more parcels to the primary delivery location and then notifies the consignee of the status of the parcel.

In still other embodiments, a locker bank inventory management system comprises a computerized locker bank comprising: (1) a plurality of selectively securable locker compartments comprising a total number of lockers, each of the plurality of selectively securable locker compartments comprising one or more doors and one or more locking mechanisms; (2) one or more locker bank computers comprising one or more processors and memory; (3) a plurality of portable computing devices, each respective portable computing device comprising one or more processors and memory; and (4) one or more remote logistics servers comprising one or more processors and memory. The memory stores: (1) data related to a current inventory of parcels stored at the computerized locker bank, the data comprising (a) a first number of the total number of lockers that are currently storing one or more stored parcels, (b) a second number of the total number of lockers that are reserved for a future delivery of one or more incoming parcels, and (c) a third number of the total number of lockers that are available to accept delivery of one or more other parcels; (2) historical parcel retrieval data for the computerized locker bank; and (3) one or more pieces of package level detail information for a plurality of parcels, wherein the one or more pieces of package level detail information comprise, for each respective parcel of the plurality of parcels, tracking information for the respective parcel and consignee information for the respective parcel comprising consignee parcel retrieval habit data. In various embodiments, the one or more processors are configured to: (1) operate the one or more locking mechanisms to open the one or more doors; (2) determine that at least one of the one or more stored parcels have been retrieved from the computerized locker bank; (3) determine that at least one new parcel has been deposited in one of the plurality of selectively securable locker compartments; (4) modify the data related to the current inventory of parcels in response to determining that at least one of the one or more stored parcels have been retrieved from the computerized locker bank or at least one new parcel has been deposited in one of the plurality of selectively securable locker compartments to ensure that the data related to the current inventory of parcels is up-to-date; (5) receive an indication that delivery of one or more undeliverable parcels is not possible at a primary delivery location from a particular portable computing device of the plurality of portable computing devices via a logistics network; (6) in response to receiving the indication, reserve a locker at the computerized locker bank for the one or more parcels and modify the second number of the total number of lockers that are reserved for a future delivery of one or more incoming parcels to include the one or more undeliverable parcels; (7) determine a first projected number of the one or more stored parcels that are projected to be retrieved from the computerized locker bank by a future time based on the tracking information, the historical parcel retrieval data, and the consignee parcel retrieval habit data; (8) determine a second projected number of the one or more incoming parcels that are projected to be delivered to the locker bank by the future time based on the tracking information; and (9) generate a virtual inventory of parcels projected to be stored at the computerized locker bank at the future time based on the data related to a current inventory of parcels stored at the computerized locker bank, the determined first projected number, and the determined second projected number.

In various embodiments, a computer-implemented method for directing one or more parcels to a suitable alternate delivery location comprising: (1) forecasting, by a processor, whether the alternate delivery location has capacity at a first time to accept the one or more parcels based at least in part on one or more second pieces of information selected from a second group consisting of (a) consignee information associated with one or more parcels currently at the alternate delivery location, (b) a pick-up time of one or more parcels previously stored at the alternate delivery location, (c) an average length of time that one or more parcels were left at the alternate delivery location prior to being picked up, (d) the number of total available spaces at the alternate delivery location, and (e) the size of the spaces available in the alternate delivery location; and (2) at least partially in response to forecasting storage availability at a first time for the alternate delivery location, assigning the one or more parcels to the alternate delivery location.

BRIEF DESCRIPTION OF THE DRAWINGS

Various embodiments of an alternative delivery location network with enhanced forecasting abilities are described below. In the course of this description, reference will be made to the accompanying drawings, which are not necessarily drawn to scale, and wherein:

FIG. 4A is a diagram of the actual inventory of a locker bank, such as the locker bank shown in FIG. 1, at the time that a delivery exception occurs (after a driver attempts, unsuccessfully to deliver a parcel to a particular primary delivery address);

FIG. 4B is a diagram of a forecasted inventory of the locker bank of FIG. 4A, at a time after the delivery exception referenced above in regard to FIG. 4A occurs;

FIG. 5A is a diagram of the actual inventory at a locker bank, such as the locker bank of FIG. 4A, at a time after a delivery exception occurs but before a parcel is delivered to the locker bank;

FIG. 5B is a diagram of a forecasted inventory of the locker bank of FIG. 5A at a time after the time depicted in FIG. 5A.

DETAILED DESCRIPTION OF VARIOUS EMBODIMENTS

Figure 1:
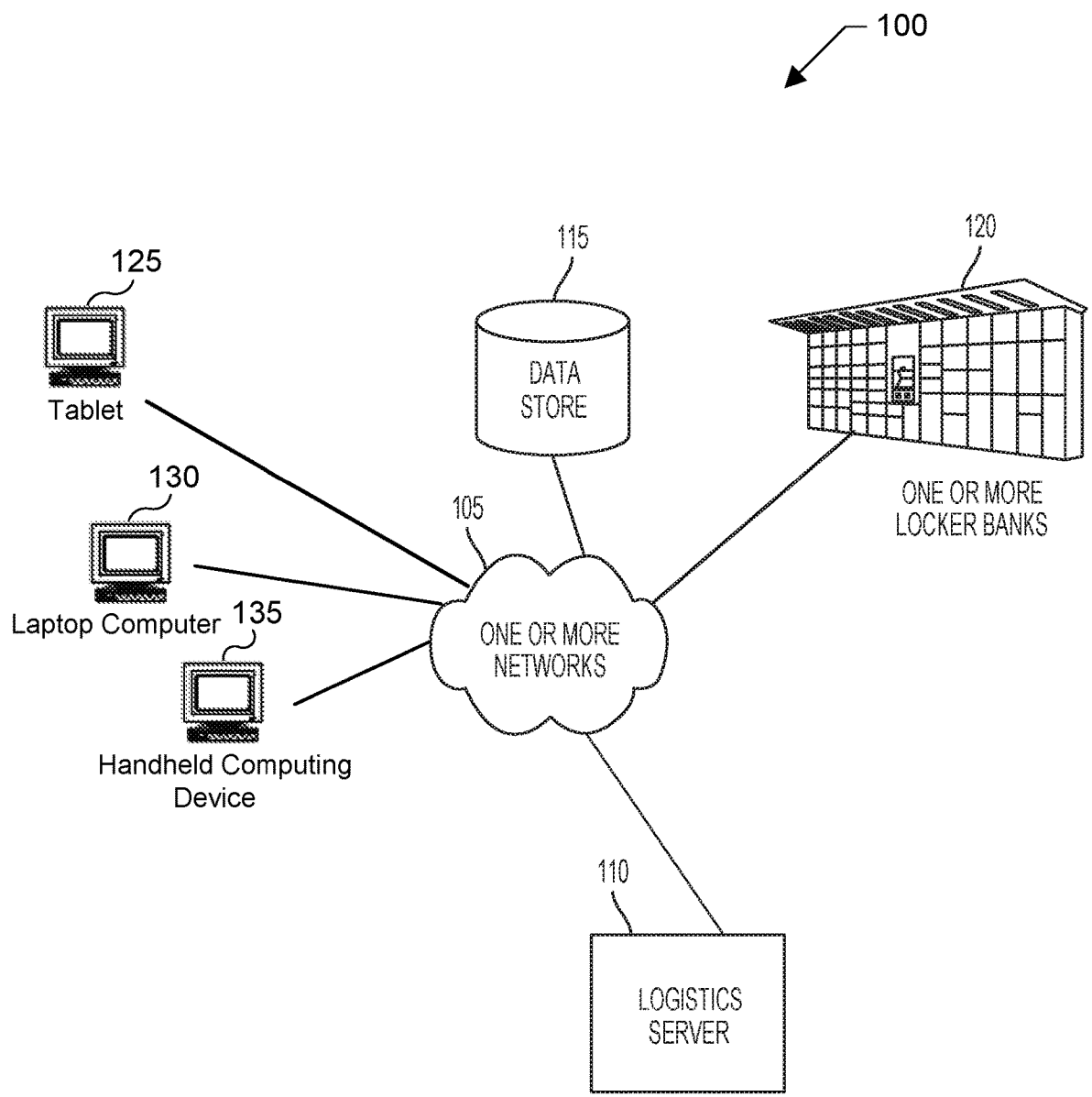
FIG. 1 is a block diagram of an alternate delivery location forecasting and delivery system in accordance with an embodiment of the present system.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

Logistics systems according to various embodiments are adapted to forecast the availability of locker banks or other alternate delivery locations (e.g., staffed parcel pickup locations, such as UPS Access Points™) to accept parcels of particular sizes at particular times in the future. For example, the system may forecast the likely availability of a particular size of locker (or any of a plurality of different sizes of locker that would accommodate the parcel) within a particular locker bank at a particular time at which a parcel is to be delivered to the locker bank. This may allow the system to coordinate delivery of the parcel to the particular locker bank if the particular locker bank is available and, if not, to: (1) re-route the parcel to another alternate delivery location (e.g., another locker bank) that is predicted to have the capacity to accept the parcel at the time that the parcel would be delivered to the alternate delivery location; (2) route a mobile locker bank to a position that is adjacent the locker bank to provide additional locker capacity for the parcel and other parcels; (3) schedule the parcel to be delivered or re-delivered to an address of the consignee; and/or (4) take any other suitable action to facilitate delivery of the parcel to the consignee while avoiding a likely failed attempt to deliver the parcel to a locker bank or other alternate delivery location. This may help prevent the carrier from wasting resources on attempting to deliver the parcel to an alternate delivery location that doesn't have capacity to store the parcel.

Various embodiments of the system are particularly suitable for use in a "not-in-one" delivery situation in which: (1) a carrier has made an unsuccessful attempt to deliver a parcel to a primary address associated with the parcel's consignee (e.g., the consignee's home or work address); and (2) a decision was made to deliver the parcel to an alternate delivery location for later pickup by the consignee, rather than attempting to redeliver the parcel to the consignee's primary address. In such situations, it is particularly useful to be able to accurately forecast the availability of an alternate delivery location to accept delivery of the parcel in order to avoid a likely failed attempt to deliver the parcel to a locker bank or other alternate delivery location. It should be understood that various embodiments of the system may also be used in the context of direct deliveries from a shipper to a consignee.

Exemplary Technical Platforms

As will be appreciated by one skilled in the relevant field, a system for forecasting a future inventory of available lockers may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Any suitable computer-readable storage medium may be utilized to store the software including, for example, hard disks, compact disks, DVDs, optical storage devices, and/or magnetic storage devices.

Various embodiments are described below with reference to block diagrams and flowchart illustrations of methods, apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

FIG. 1 is a block diagram of a logistics system 100 according to a particular embodiment. As may be understood from this figure, the logistics system 100 includes one or more computer networks 105; a logistics server 110; a data store 115 such as a suitable database or other suitable data structure; one or more locker banks 120 that may include one or more locker computers, one or more remote computing devices such as a tablet computer 125, a desktop or laptop computer 130; and a handheld computing device 135, such as a cellular phone or a DIAD device, such as the computing device that is currently used by UPS' drivers to facilitate the delivery and pickup of parcels. In particular embodiments, the one or more computer networks 105 facilitate communication between the logistics server 110, the data store 115, the one or more locker banks 120, and/or the one or more remote computing devices 125, 130, 135.

The one or more computer networks 105 may include any of a variety of types of wired or wireless computer networks such as the Internet, a private intranet, a public switch telephone network (PSTN), or any other type of network. The communication link between the logistics server 110, the data store 115, and the one or more locker banks 120 may be, for example, via the Internet.

The term "system" may be used below to refer to an embodiment of a logistics system, such as the logistics system shown in FIG. 1 and described in the related text. However, it should be understood that the various steps described herein may be executed by any particular computer associated with the system (e.g., the logistics server 110, an internal computer of the locker bank 120, or any other computing device associated with, or not formally associated with, the logistics system 100.

Figure 2:
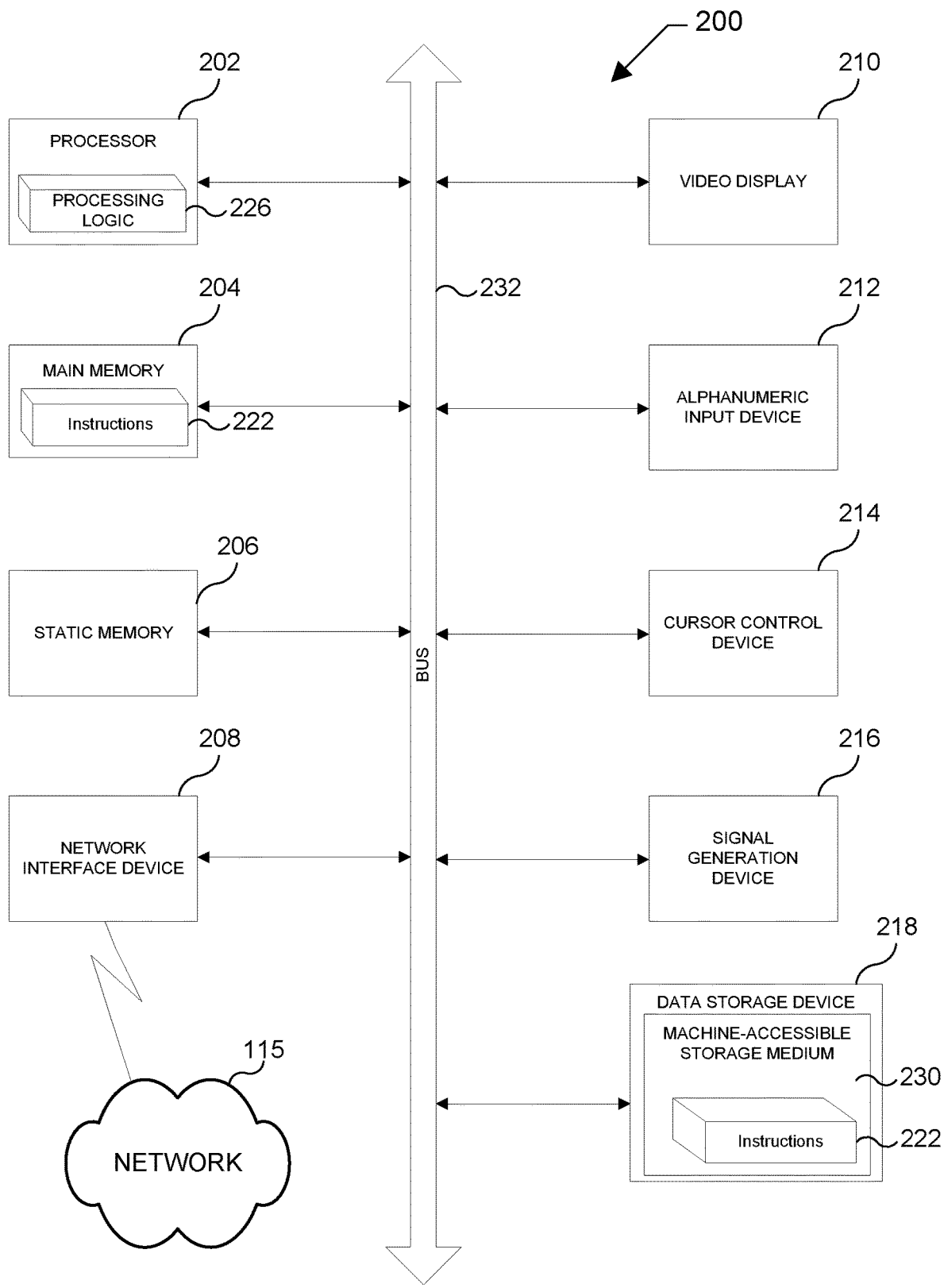
FIG. 2 is a schematic diagram of a computer, such as the logistics server of FIG. 1, that is suitable for use in various embodiments.

FIG. 2 illustrates a diagrammatic representation of an architecture of a computing device 200 that can be used within the system 100, for example, as the logistics server 110 or one of the one or more remote computing devices 125, 130, 135, or a computer that is physically associated with the (e.g., physically integrated within) the locker bank 120. As discussed above, in particular embodiments, the computer 200 may be connected (e.g., networked) to other computers in a LAN, an intranet, an extranet, and/or the Internet (e.g. by the one or more networks 105). In various embodiments, the computer 200 may operate in the capacity of a server or a client computer in a client-server network environment, or as a peer computer in a peer-to-peer (or distributed) network environment. The computer 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" should also be taken to include any collection of computers that individually or jointly execute a set (or multiple sets) of instructions to perform any one or more of the methodologies discussed herein.

As shown in FIG. 2, an exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 200 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-readable storage medium 230 (also known as a non-transitory computer-readable storage medium or a non-transitory computer-readable medium) on which is stored one or more sets of instructions (e.g., software 222) embodying any one or more of the methodologies or functions described herein. The software 222 may also reside, completely or at least partially, within main memory 204 and/or within processing device 202 during execution thereof by the computer 200—main memory 204 and processing device 202 also constituting computer-accessible storage media. The software 222 may further be transmitted or received over a network 220 via the network interface device 208.

While the computer-readable storage medium 230 is shown in an exemplary embodiment to be a single medium, the terms "computer-readable storage medium" and "machine-accessible storage medium" and the like should be understood to include a single medium or multiple media (e.g., a centralized or distributed database, and/or associated caches and servers) that store the one or more sets of instructions. The term "computer-readable storage medium" should also be understood to include any medium that is capable of storing, encoding or carrying a set of instructions for execution by the computer and that cause the computer to perform any one or more of the methodologies of the present invention. The term "computer-readable storage medium" should accordingly be understood to include, but not be limited to, solid-state memories, optical and magnetic media, etc.

Example System Structure and Operation

Various embodiments of a logistics system for forecasting the availability of an alternate delivery location, such as a locker bank, to accept delivery of a parcel may be implemented within the context of any suitable logistics service. For example, particular embodiments may be implemented within the context of any logistics service (such as those provided by United Parcel Service of America, Inc. of Atlanta, Ga.). Various aspects of the system's functionality may be executed by one or more processors executing certain system modules, such as a Parcel Redirection and Inventory Forecasting Module 300. This module is discussed in detail below. It should be understood that the functions described in connection with these modules may, in various embodiments, not necessarily be implemented in the module-type architecture described (e.g., the computer functions do not have be organized into modules). Rather, various embodiments are described in connection with this type of modular structure to facilitate understanding of various concepts described herein. In addition, the functions described may be distributed between different computers in the logistics system and are not necessarily carried out by a single computer in the logistics system.

In certain examples below, the system is described as forecasting the availability of an alternate delivery location to accept a particular parcel that has been redirected from a primary delivery location (e.g., the consignee's home or business address) to an alternate delivery location in the event that delivery to the primary delivery location isn't possible. However, it should be understood that the system may also be used outside of the context of such "not-in-one" deliveries. For example, the logistics system may be used to coordinate the delivery of parcels directly from a shipper to an alternate delivery location, such as a locker bank or an attended parcel pickup and/or delivery location, such as a retail store that serves as a designated alternate delivery location for packages.

Parcel Redirection and Inventory Forecasting Module

Figure 3:
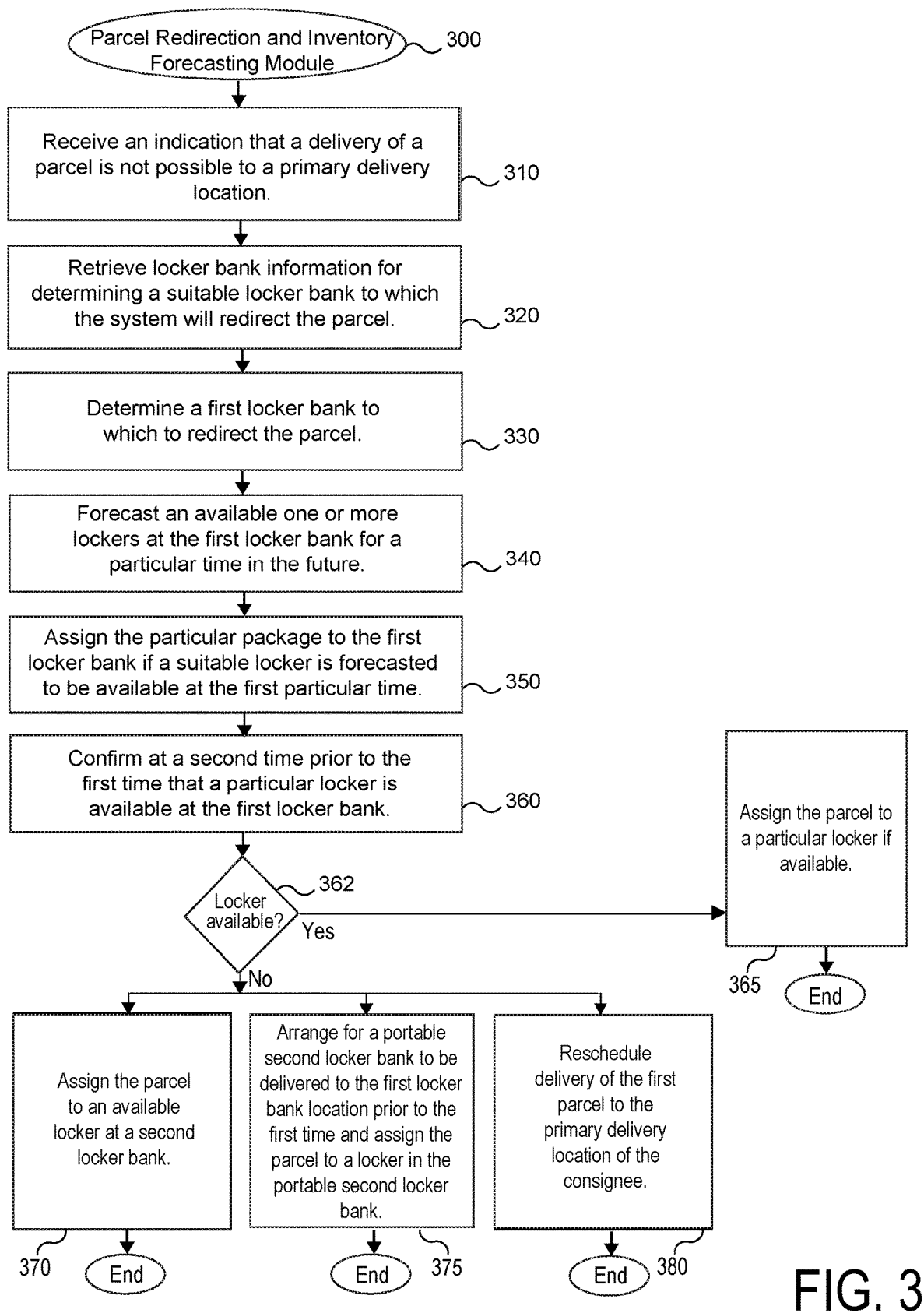
FIG. 3 is a flow chart that generally illustrates various steps executed by a Parcel Redirection and Inventory Forecasting Module that, for example, may be executed by the logistics server of FIG. 1.
Figure 6:
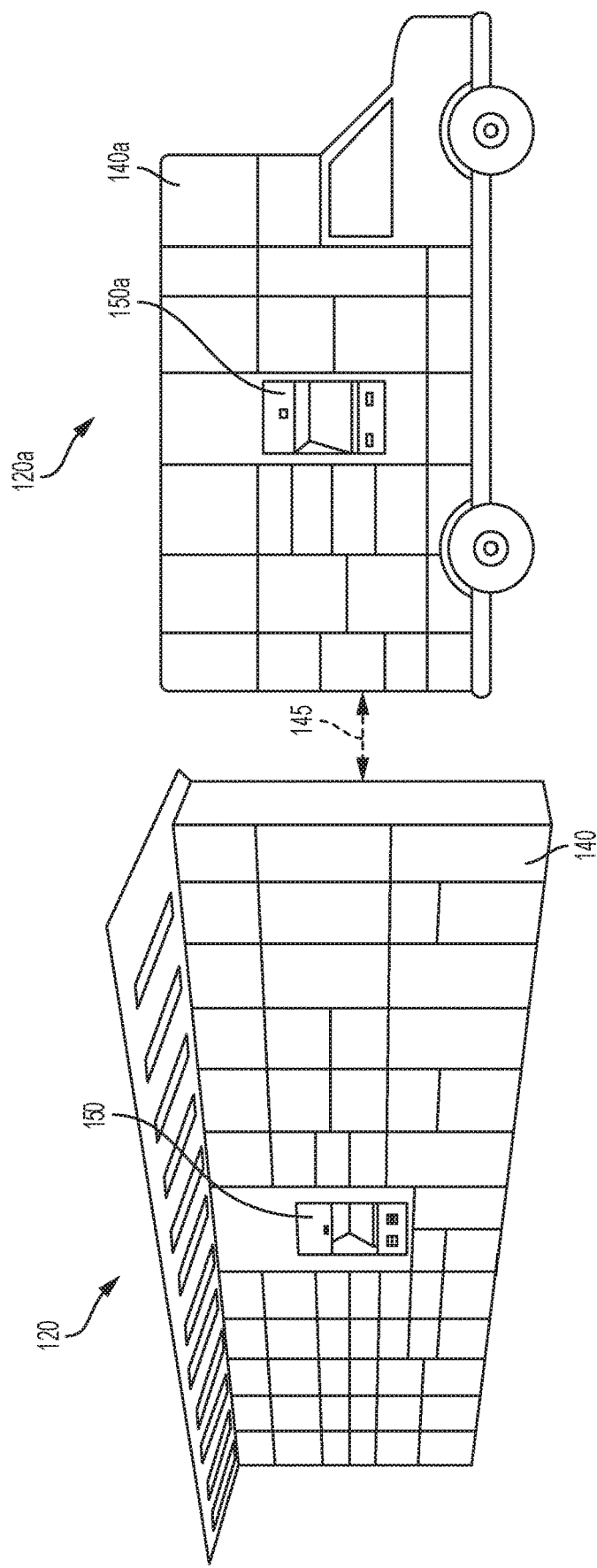
FIG. 6 shows an exemplary mobile locker bank and locker bank according to various embodiments.

FIG. 3 is a flow chart of operations performed by an exemplary Parcel Redirection and Inventory Forecasting Module 300. In particular embodiments, the Parcel Redirection and Inventory Forecasting Module 300 may facilitate redirection of one or more parcels from a primary delivery location (e.g., the original intended delivery location of a parcel, such as the consignee's home or business address) to an alternate delivery location (e.g., such as a suitable locker bank or attended parcel pickup and/or delivery location, such as a UPS Access Point™). Although the description of an example Parcel Redirection and Inventory Forecasting Module 300 below particularly describes the redirection of a parcel to a locker bank, it should be understood in the context of this disclosure that the Parcel Redirection and Inventory Forecasting Module 300 may be utilized in the context of the logistics system to redirect one or more parcels to any other suitable alternate delivery location or other location.

A. Receipt of an Indication of Non-Delivery of a Parcel to a Primary Delivery Location When executing the Parcel Redirection and Inventory Forecasting Module 300, the system begins, at Step 310, by receiving an indication that delivery of a parcel is not possible (e.g., according to the parcel carrier's operating policies) to a primary delivery location. Receiving information regarding a non-delivery of parcel to a primary delivery location is described in greater detail in U.S. Patent Application Publication No. 2015/0106292, filed Oct. 14, 2014, entitled Systems and Methods For Facilitating Delivery of a Parcel to a Suitably Sized Locker (hereinafter the "'292 application"), which is hereby incorporated herein by reference in its entirety.

B. Retrieval of Locker Bank Information for Use in Determining a Suitable Locker Bank to which the System Will Redirect the Parcel Next, at Step 320, the system continues by retrieving locker bank information associated with the primary delivery location, which the system may later use to determine which locker bank to reroute the parcel to. A detailed description of retrieving locker bank information for use in determining a suitable locker bank is further described in detail in the '292 Application referenced above.

C. Determination of a Suitable Locker Bank for the Delivery Based on the Received Locker Bank Information Still referring to FIG. 3, at Step 330, the system continues by determining an appropriate locker bank based at least in part on the locker bank information retrieved at Step 320. A detailed description of how the system may determine a suitable locker bank is further described in detail in the '292 application referenced above.

D. Forecast an Available One or More Lockers at the First Locker Bank for a Particular Time in the Future Referring once again to FIG. 3, the system continues, at Step 340, by forecasting the availability of one or more lockers at the designated locker bank determined in Step 330, for a particular time in the future. In particular embodiments, the particular time in the future is an estimated time that the delivery driver is expected to arrive at the first locker bank to drop off one or more undeliverable parcels. The particular time may be estimated (e.g., using any suitable logistics algorithm) based on one or more of the driver's preassigned routes, the number of prior delivery exceptions handled by the driver that day, the number of estimated locker banks to be visited for alternate deliveries, or any other suitable factor.

In particular embodiments, forecasting the availability of one or more lockers is performed by first determining the locker's current inventory at the time of the delivery exception and then using that inventory information to forecast the locker's inventory at the time that the driver is expected to arrive at the locker bank. Suitable techniques for forecasting the future inventory of a locker bank based on the current inventory of the locker bank are discussed in greater detail later in this document.

E. Assign the Particular Parcel to the First Locker Bank if a Suitable Locker is Forecast to be Available at the First Particular Time At Step 350, the system assigns the parcel to the locker bank if a locker is forecasted to be available at a time in the future when the delivery driver is estimated to arrive at the locker bank. It should be understood that assigning the parcel to the locker bank does not necessarily mean that a particular suitable locker in the locker bank is reserved for the parcel. Instead, the system assigns an undeliverable parcel to a locker bank if the system forecasts that a locker should be available at the particular time in the future when the driver will arrive at the locker bank to deliver one or more undeliverable parcels (e.g., parcels that were determined to be not deliverable to a particular primary delivery location due to the fact that no suitable individual was present at the primary delivery location to accept delivery of the parcel, and leaving the parcel unattended at the primary delivery location would have violated one or more policies of the carrier handling delivery of the parcel). Assigning the parcel to the locker bank may allow the system to more accurately forecast the available inventory of lockers in the future as additional delivery exceptions arise throughout the day. In various embodiments, the forecast of potential inventory may take into account all delivery exceptions that have already been assigned to the locker bank as well as any other parcel deliveries that have been assigned to the locker bank. For example, in various embodiments, the system may be configured to schedule and account for parcels that are routed directly from the shipper to the locker bank in addition to "not-in-one" deliveries described above.

F. Confirming, at a Second Time Prior to the First Time, Whether a Particular Suitable Locker is Available at the First Locker Bank Continuing at Steps 360 and 362, the system, in various embodiments, confirms, at a time prior to the time when the delivery driver arrives at the locker bank to deliver the parcel, whether a suitable locker is available to accept the parcel at the locker bank.

In some embodiments, the system confirms at a time prior to a particular parcel arriving at the locker bank that a suitable locker will actually be available for the parcel when the parcel is delivered to the locker bank by assessing the locker's inventory at the second time, as described above. The second time may be any suitable time prior to the estimated delivery time of the parcel to the locker, such as one hour prior to the time that the delivery driver is projected to arrive at the locker bank to deliver the parcel. In other embodiments, the second time may be determined based on the location of the delivery driver with respect to the locker bank (e.g., the delivery driver's distance from the locker bank, or the number of stops that the delivery driver is scheduled to complete before arriving at the locker bank). For example, if the system determines, based on a telematics information associated with the delivery vehicle, that the driver is three stops away from the locker bank, the system may confirm whether a suitable locker is actually available to accept delivery of the parcel at the locker bank. In other embodiments, the system may confirm whether a particular suitable locker is available at the locker bank on a periodic basis before the scheduled delivery of the parcel to the locker bank (e.g., every hour after the delivery exception occurs until the parcel is delivered to a suitable locker bank). In still other embodiments, the system may not confirm whether a particular suitable locker is available at the locker bank until the delivery driver completes their last scheduled stop before stopping at the locker bank.

1. If a Particular Suitable Locker is Available at the Locker Bank, Assign the First Parcel to the Particular Suitable Locker At Step 365, if the system confirms that a particular suitable locker is available for the parcel at Step 362, in various embodiments, the system assigns the parcel to the particular suitable locker. By assigning the parcel to the locker, the system updates the parcel's package level detail information to indicate that the parcel will be delivered to the locker bank and updates the locker bank information to associate the parcel with the particular suitable locker. When a parcel is assigned to a particular suitable locker at a locker bank, the system may also update the route information on the system to show that the driver will deliver one or more parcels to the particular suitable locker bank.

2. If No Suitable Locker is Available, Take a Suitable Action a. Assign the Parcel to an Available Locker at a Second Locker Bank

If the system determines, at Steps 360 and 362, that a particular suitable locker at the locker bank is not available at the locker bank, the system may optionally perform one of the following alternate delivery options for the parcel: (1) assign the parcel to an available locker at a second locker bank; (2) arrange for a portable second locker bank to be delivered adjacent the first locker bank prior to the first time and assign the parcel to a locker in the portable second locker bank; (3) reschedule delivery of the parcel to the primary delivery location of the consignee, as described in more detail below; or (4) take any other suitable steps.

Continuing, at Step 370, if the system confirms at a time prior to delivery to the locker bank that a suitable locker at the locker bank is not available to accept the parcel, the system may assign the parcel for delivery to an available locker at a second locker bank (e.g., an alternate locker bank) that may, for example, be located proximate to the original first locker bank. Delivering an undeliverable parcel to a second locker bank that is close to the first locker bank may be more advantageous than trying to redeliver the parcel to the primary delivery address on a subsequent day since the driver may already be scheduled to deliver one or more other parcels to the second locker bank. The second locker bank may, for example, be an alternate locker bank that the consignee has indicated to be an acceptable locker bank in their preferences in their UPS My Choice™ account, a locker bank that has been designated (e.g., by a logistics provider handling the delivery) as a backup locker bank for the consignee and/or the consignees address, or any other suitable locker bank.

b. Arrange for a Portable Locker Bank to be Delivered to the Location of the Locker Bank and Assign the Parcel to a Particular Suitable Locker in the Portable Locker Bank Continuing, at Step 375, if the system determines that a suitable locker is not available at the locker bank when the system confirms the locker bank's inventory at a time prior to the scheduled delivery of the parcel to the locker bank, the system may arrange for a separate, portable locker bank to be delivered to the locker bank to provide overflow capacity for the locker bank. The portable locker bank may, for example, be a self-driving vehicle that contains one or more lockers, a trailer containing one or more lockers and a locker bank computer, or any other suitable portable locker bank structure. Portable locker bank structures are discussed in greater detail in U.S. Patent Application No. 62/440,456 which was filed on Dec. 30, 2016 and entitled Mobile Locker Bank Systems And Methods, and which is hereby incorporated herein by reference (hereinafter the "Mobile Locker Bank Systems and Methods patent application").

c. Reschedule Delivery of the Parcel to the Primary Delivery Location

At Step 380, if the system determines that a suitable locker is not available at the locker bank when the system confirms the locker bank's inventory at a time prior to the scheduled delivery of the parcel to the locker bank, the system may determine that the best course of action for an undeliverable parcel is to reschedule delivery of the parcel on another day to the primary delivery location of the consignee. In such cases, the system may reschedule delivery of the parcel for the next day or on another day of the week when the consignee will be at the primary delivery location. In various embodiments, the system may be configured to send an electronic message to the consignee indicating that delivery was attempted but unsuccessful. In some embodiments, the notification may allow the consignee to provide an alternate delivery date when the consignee or a designated representative of the consignee will be at the primary delivery address to receive the parcel. In other embodiments, the system may reschedule delivery of the parcel based on delivery of other parcels scheduled to be delivered to the primary delivery address. In yet other embodiments, delivery of the parcel may be scheduled for the next business day.

G. Delivery of the Parcel to the Determined Suitable Locker Bank

If the system (1) assigns the parcel to a suitable locker in the first locker bank, (2) assigns the parcel to a suitable locker bank at a second locker bank or (3) arranges for the delivery of a portable locker bank and assigns the parcel to a suitable locker in the portable locker bank, the driver will then deliver the parcel to a suitable locker within the appropriate assigned locker bank. Various embodiments of systems for delivering one or more parcels to alternate delivery locations may further include systems for managing the placement of parcels in and retrieval of parcels from particular lockers in a particular locker bank, for example, by representatives of common carriers such as delivery drivers, employees at staffed locker banks, etc. Although it should be understood that any suitable systems and methods may be used for managing the delivery of parcels to, and pickup of parcels from, particular locker banks, suitable example systems and methods for doing so are described in the '292 publication referenced above.

Forecasting Methods

In various embodiments, the system may forecast the inventory of a locker bank at any particular time based on, for example: (1) historical data for the locker bank regarding the past pickup of parcels from the locker bank on particular days of the week and times of day; (2) historical data for the locker bank regarding when the respective consignees of parcels that are stored within the locker bank typically retrieve their parcels; (3) location information for individuals that are authorized to retrieve parcels that are currently stored within the locker bank; (4) age-out information for any parcels that are currently stored within the locker bank; or (5) any other suitable information.

1. Historical Data Regarding the Pickup of Parcels from the Locker Bank on Particular Days of the Week and Particular Times of Day In various embodiments, the system may be configured to determine the probability of a parcel being picked up on a particular day of the week and/or during a particular time window based on the behavior of a plurality of consignees that have previously picked up one or more parcels stored at the locker bank (e.g., based on historical parcel retrieval data for the locker bank—such as all, or substantially all, available historical parcel retrieval data available for the locker bank). In particular, the system may aggregate and analyze this data and use any suitable statistical methods to assign an overall probability that a particular parcel will be retrieved from the locker bank for each day of the week based on pickup information for parcels that were previously retrieved from the locker bank. For example, if the system determines that most parcels are picked up on Mondays and Fridays, then these days would be generally assigned a higher probability of pickup as compared with the probability assigned for the remaining days of the week.

Additionally, the system may calculate a probability that a parcel pick-up will occur for a particular time (e.g., particular time as expressed in hours/minutes, or particular time window (e.g., 8 am-10 am, 10 am-12 pm, 12 pm-2 pm, 2 pm-4 pm, etc.)) for any given day based on the pick-up time of parcels that were previously retrieved from the locker bank. For example, the system may determine that, on Mondays, 40% of parcels stored within the locker bank are typically picked up between 6 am-8 am, and that, on Fridays, 45% of parcels stored within the locker bank are typically picked up between 6 pm-8 pm. As such, the probability assigned to these time windows for the respective day of the week would be significantly higher than the assigned probability of other time windows on the same day of the week. Based on the various calculated probabilities that a parcel will be retrieved on a particular day and/or within a particular time window, the system predicts the likelihood that a currently-stored parcel will be picked up on a certain day during a certain time window. Using the calculated probabilities, the system may create a forecast of the locker's inventory for any particular day and time window.

2. Consignee Historical Data as to when the Respective Consignees of Parcels that are Stored within the Locker Bank Typically Retrieve their Parcels In various embodiments, the system is configured to analyze (e.g., using any suitable data processing algorithm) the previous behavior of one or more consignees currently having parcels stored at the locker bank. For example, the system may track and store information related to a consignee's behavior with respect to one or more parcels that were previously stored at, and retrieved from, a particular locker bank. Based on the stored information, the system may determine: (1) an average length of time that a consignee leaves a parcel in a locker at the particular locker bank before picking up the parcel; (2) typical days of the week on which the consignee retrieves parcels from the locker bank (e.g., the consignee always retrieves any parcels that they have at the locker bank on a Friday); (3) particular time windows during which the consignee typically or always retrieves parcels from the locker bank (e.g., the consignee typically retrieves parcels between 6:00 pm-6:30 pm). The system may then use this information (e.g., as described above) to forecast the inventory at a locker bank at a particular time.

3. Location Information Associated with Consignees Having Parcels Currently Stored within the Locker Bank In various embodiments, the system may track the location of a consignee, (or others who are authorized to pick up parcels on behalf of the consignee) and use that information to assess the probability that a particular parcel will be picked up on a particular day. For example, if the system determines that all individuals who are authorized to pick up a particular parcel are currently out of town, the system may assign a 0% probability to the parcels being picked up over a suitable subsequent period of time, which may be calculated, for example, based on the individuals' respective locations and the forecasted travel time between the locker bank and those current locations. As an example, if only the consignee is authorized to pick up a particular parcel stored at the locker bank and the system determines that the individual is at a location that is seven hours away from the locker bank, by plane, the system may assign a 0% probability to the parcel being picked up within the next seven hours.

The system may determine the individual's location in any suitable way. For example, if a consignee has an account (e.g., a UPS MyChoice Account) associated with a particular logistics provider that is servicing the locker bank, and the consignee uses an application on a handheld computing device to access their account, the system may use GPS coordinates associated with the handheld device to determine the consignee's present location (assuming that the consignee is in possession of their handheld device). The system may use any other appropriate method of determining the individual's location, such as determining their location through one or more social media posts, electronically submitted travel schedules, etc.

In various embodiments, if the system determines that the consignee is within a particular distance from the locker bank, the system may send the consignee a reminder notification that their parcel is awaiting pick-up from the locker bank. In some embodiments, the system may offer the consignee one or more discounts, such as future discounts on shipping services, discounts on a sponsor's products or services, etc. to entice the consignee to pick up their parcel on a particular date and/or before a particular time. In this way, the system can send reminders to the consignee to increase the likelihood that the consignee picks up their currently stored parcel at the locker bank thereby increasing the number of available lockers.

Furthermore, the system may be configured to send reminder one or more notices that allow the consignee to respond regarding whether the parcel will be picked up on a particular day and/or before a particular time. Thus, in the manner described above, the system may adjust its locker inventory forecasts based on location information of consignees that currently have a parcel awaiting pick-up at the locker bank (or their representatives) and/or based on a consignee's, or other individual's, response to notifications.

4. Parcel Age-Out Information

In various embodiments, the package level detail information for parcels stored in a locker bank further comprises the day and time the parcel was originally stored in a locker at a particular locker bank. The computerized locker system is configured to track the number of days that a parcel is typically stored at the locker bank. In some embodiments, the system may be set to include an age-out number of days that a parcel is left at the locker bank for pick up after which the parcel is removed from the locker bank and attempted to be redelivered, held at a central logistics location, or sent back to the sender.

In particular embodiments, the age-out number of days may be set to the same number of days for all parcels in all of the system's various locker banks. In other embodiments, the age-out number of days may be set for each parcel within a particular locker bank based on any suitable factor, such as the average length of time that parcels are stored in the particular locker bank (e.g., parcels within each locker bank may be set to age-out X days after the parcels are dropped off at the locker bank, where X is the average length of time that parcels are held at the locker bank plus, optionally, a predetermined number of additional days). In yet other embodiments, the age-out number of days may be set for a particular consignee based on the average number of days that the consignee leaves a parcel at a locker bank (e.g., parcels left at a locker bank for a particular consignee may be set to age-out X days after the parcels are dropped off at the locker bank, where X is the average length of time that it takes the consignee to pick up parcels from the locker bank plus, optionally, a predetermined number of additional days).

In various embodiments, the system may forecast inventory for a particular date and time using the calculated age-out number of days for parcels stored at the locker bank. That is, in generating its forecast, the system will assume that parcels will be picked up on their "age-out" day (or a predetermined number of days after their age-out day) and, optionally, schedule those parcels for pick-up by a carrier on the appropriate day.

Example Parcel Delivery Process

An example parcel delivery process will now be discussed in reference to FIGS. 4 and 5. In this example, a delivery driver attempts to deliver a parcel to the home address of the consignee. However, when the driver arrives as the consignee's home address, no one is home to accept delivery of the parcel, and the driver is not comfortable leaving the parcel outside of the home for later retrieval by the consignee. Using a portable computing device, such as a DIAD, the driver scans the parcel's bar code and uses a user interface on the portable computing device to indicate that an attempt to deliver the parcel to the consignee's home address was unsuccessful. At that point, the portable computing device communicates this to the logistics server, which initiates the process of forecasting the availability of a locker bank that has been assigned, by the carrier that is handling the parcel, as a default locker bank for accepting parcels from the consignee's address that are subject to a not-in-one delivery, such as the delivery at issue.

Referring to FIG. 4A, when this forecasting process begins (e.g., at the time that the delivery exception occurs— e.g., at 10 am), the logistics server checks the current inventory of the locker bank to determine whether there are any available lockers at the selected locker bank. The logistics server then returns the inventory shown in FIG. 4A, in which unavailable lockers are shown with an "X" marking and available lockers are shown with an "A" marking. As shown in FIG. 4A, the logistics server determines that one large locker is currently available.

Next, the logistics server uses suitable routing and scheduling software to predict the driver's time of arrival at the locker bank, and uses the locker bank's current inventory, plus a suitable inventory forecasting algorithm (such as those discussed herein) to forecast the locker bank's inventory at the time that the driver is to arrive at the locker bank to deliver the parcel. For example, if the logistics server projects that the driver will arrive at the locker bank within a 6 pm-8 pm time window on the same day as the delivery exception, the system will forecast the locker bank's inventory within the 6 pm-8 pm time window. In the current example, as shown in FIG. 4B, the system forecasts that four lockers (two small lockers, one medium locker, and one large locker) should be available during the 6 pm-8 pm time window.

The logistics server then determines, based on this forecasted inventory, whether a suitable locker is forecasted to be available during the time window in which the parcel is to arrive at the locker bank. For example, if the parcel at issue is sized so that it would fit into either a medium or a large locker at the locker bank, the logistics server will determine whether a medium or large locker is available in that time window (e.g., the 6 pm-8 pm). As may be understood from FIG. 4B, in this example, the logistics server forecasts that two suitably sized lockers (a medium locker and a large locker) will be available at the time that the parcel will be delivered to the locker bank, so the logistics server routes the parcel for delivery to the locker bank within the 6 pm-8 pm time window.

If the system had forecasts that no suitable locker would be available at the locker bank during the 6 pm-8 pm time window, the logistics server may take any suitable action, such as using similar techniques as those described above to determine whether a second locker bank would be available to accept delivery of the parcel at a time when the delivery driver is projected to arrive at the second locker bank. Alternatively, the logistics server may simply reschedule delivery of the parcel to the consignee's primary delivery address on a different day, or route the parcel in any other suitable manner.

Returning to the example of FIGS. 4A and 4B, after the logistics server forecasts that the locker bank will have capacity to accept delivery of the parcel within the 6 pm-8 pm time window, the driver continues on their delivery route. At a particular time before the driver arrives at the locker bank (e.g., when the driver arrives at the stop on the delivery driver's route immediately prior to a stop that includes the locker bank), the logistics server again determines the locker bank's current inventory (and optionally forecasts the locker bank's inventory at the driver's anticipated time of arrival at the locker bank). If the logistics server determines that the locker bank currently has capacity to accept delivery of the parcel, the system may: (1) reserve a particular locker within the locker bank for the parcel; (2) simply maintain the assignment of the package for delivery to the locker bank; or (3) take any other suitable action. If the logistics server determines that the locker bank will not be available when the driver arrives at the locker bank, the logistics server may take any suitable action, such as using techniques similar to those described above to determine whether a second locker bank would be available to accept delivery of the parcel at a time when the delivery driver arrives at the second locker bank. Alternatively, the logistics server may simply reschedule delivery of the parcel to the consignee's primary delivery address on a different day, or route the parcel in any other suitable manner.

Returning to the particular example above, when the driver arrives at the stop on their delivery route that is immediately prior to a stop that includes the locker bank, the logistics server automatically checks the current inventory of the locker bank and determines whether a suitable locker is still available to accept delivery of the parcel. In this example, as may be understood from FIG. 5A, the system determines that there are four lockers currently available (three small lockers and one large locker) at the time when the locker bank's actual inventory is checked. Because only the large locker will accommodate the parcel, the system assigns the parcel to the large locker and routes the driver to deliver the parcel to the designated large locker within the locker bank. The driver then delivers the parcel to the locker, and the consignee later retrieves the parcel from the locker.

Example Forecasting Techniques

As discussed above, in various embodiments, the logistics server may forecast the inventory of a locker bank at any particular time based on, for example: (1) historical data for the locker bank regarding the past pickup of parcels from the locker bank on particular days of the week and/or times of day; (2) historical data for the locker bank regarding when the respective consignees of parcels that are stored within the locker bank typically retrieve their parcels; (3) location information for individuals that are authorized to retrieve parcels that are currently stored in the locker bank; (4) age-out information for any parcels that are currently stored in the locker bank; or (5) any other suitable information.

As a particular example, the logistics server may identify the consignee associated with each parcel stored in a selected locker bank at a particular time and then use information regarding each consignee's past behavior, along with other information, to forecast the inventory of the locker bank for a particular time in the future (e.g., for a particular time window in which a particular parcel is forecast to arrive at the locker bank for delivery to the locker bank). For example, the system may retrieve historical parcel retrieval information for the locker bank from the system's memory and use it to determine that a particular consignee who currently has a parcel stored at the locker bank always picks up parcels on the day the parcel is delivered to the locker bank between 7 pm and 9 pm. The system may also determine that another consignee only picks up parcels from the locker bank on the Friday after the parcel is delivered to the locker bank, and that the consignee always retrieves their parcels between the hours of 5 am-7 am. Another consignee may be found to only pick up parcels stored at the locker bank the day after the parcel is delivered to the locker bank between the hours of 12 pm-1 pm (when the consignee is at lunch). The system may use similar information for each consignee that has a parcel stored in the locker bank to forecast when all of the parcels that are currently stored in the locker bank will be picked up.

In particular embodiments, if the system doesn't have historical parcel retrieval information for a particular consignee, if the system is able to determine contact information for the consignee, the system may send an electronic message to the consignee asking when they will retrieve the parcel. If the consignee responds, the system uses this information in generating a forecasted inventory for the locker bank. The system may also use this technique to enhance the more general consignee behavior information referenced above.

If the system is not able to obtain any historical information for a particular consignee having a parcel stored at the locker bank, the system may use general historical parcel pickup information for the locker bank to model when a particular consignee will likely retrieve a parcel. For example, if the parcel at issue was delivered to a locker bank on a Wednesday, and the system determines, based on general historical parcel pickup information for the locker bank, that, at the particular locker bank, consignees retrieve parcels from the locker bank within 24 hours of delivery of the parcel to the locker bank 80% of the time, the system may factor in an 80% probability of the parcel being retrieved within 24 hours of the parcel's delivery to the locker bank when the system forecasts locker availability at a particular time in the future.

In further embodiments, the system may use other, more refined data to more accurately model consignee behavior. For example, the system may use historical parcel pickup information to determine consignee-specific or non-consignee-specific average pickup times for parcels of particular sizes in general, or for parcels of particular sizes on particular days (e.g., small parcels delivered to the locker bank on Wednesdays are retrieved within 4 hours of delivery of the parcel 75% of the time). Such techniques may be refined to provide increasingly accurate forecasts of locker inventory over time.

Example Use of Mobile Locker Banks

At various times, when a fixed locker bank 120 is in use, the fixed locker bank 120 may reach a threshold capacity at which the probability of the fixed locker bank 120 being unable to accept a parcel of a particular size exceeds a predetermined threshold value. In such situations, the system may automatically, or with input from a user, route a mobile locker bank 120a to a position proximate the fixed locker bank 120 to temporarily supplement the capacity of the fixed locker bank 120. As described in the "Mobile Locker Bank Systems and Methods" patent application referenced above, the system may be configured to facilitate communication between a computer system associated with the mobile locker bank 120a and a computer system associated with the fixed locker bank 120 so that, from an inventory management perspective, the fixed locker bank 120 and mobile locker bank are treated as a single locker bank. In addition, as discussed in greater detail within the above-referenced patent application, the mobile locker bank 120a and the fixed locker bank 120 may be controlled by users by inputting commands on a computer user interface on either the mobile locker bank or fixed locker bank. Thus, the system may address forecasted capacity shortages within a particular fixed locker bank (or mobile locker bank) by using a mobile locker bank to effectively expand the capacity of the fixed locker bank (e.g., on a temporary basis).

In other embodiments, the system may address forecasted capacity shortages of a particular suitable locker by, for example, reducing the number of addresses that will have their respective "not-in-one" deliveries re-routed to the particular fixed locker bank. For example, in situations where all "not-in-one" deliveries within a particular radius of a particular fixed locker bank are to be delivered to the fixed locker bank, the system may, for example, temporarily reduce the size of that pre-determined radius in order to temporarily reduce the number of "not-in-one" deliveries that are automatically re-routed for delivery to the fixed locker bank. Although the embodiments above are described in regard to using mobile locker banks and other techniques to provide additional capacity to fixed locker banks, it should be understood that similar techniques may be used to manage and/or expand the capacity of mobile locker banks. Also, multiple mobile locker banks may be used at a particular location to provide the appropriate capacity in suitable situations.

CONCLUSION

Many modifications and other embodiments of the invention will come to mind to one skilled in the art to which this invention pertains having the benefit of the teachings presented in the foregoing descriptions and the associated drawings. While examples discussed above cover the use of various embodiments in the context of the delivery of one or more parcels to a locker bank, various embodiments may be used in any other suitable context. Similarly, while various techniques described herein are described in conjunction with facilitating delivery of a parcel that was not successfully delivered on a first delivery attempt, such techniques may also be applicable in delivering parcels directly to a primary delivery location, such as a locker bank. For example, the system may be used by online retails who allow customers to request direct delivery of their items to a locker bank or other alternative delivery location. Therefore, it is to be understood that the invention is not to be limited to the specific embodiments disclosed and that modifications and other embodiments are intended to be included within the scope of the appended claims. It should also be understood that, although various events are described above as occurring "in response to" certain triggering occurrences, those events may occur in response to only those occurrences or a combination of the triggering occurrences and other occurrences. Although specific terms are employed herein, they are used in a generic and descriptive sense only and not for the purposes of limitation.

What is claimed:

1. A locker bank inventory management system comprising:
   a. a computerized locker bank comprising:
   i. a plurality of selectively securable locker compartments comprising a total number of lockers, each of the plurality of selectively securable locker compartments comprising one or more doors and one or more locking mechanisms; and
   ii. one or more locker bank computers comprising one or more processors and memory;
   b. a plurality of portable computing devices, each respective portable computing device comprising one or more processors and memory; and
   c. one or more remote logistics servers comprising one or more processors and memory, wherein:
   i. the memory stores:
   data related to a current inventory of parcels stored at the computerized locker bank, the data comprising: a first number of the total number of lockers that are currently storing one or more stored parcels; a second number of the total number of lockers that are reserved for a future delivery of one or more incoming parcels; and a third number of the total number of lockers that are available to accept delivery of one or more other parcels;
   historical parcel retrieval data for the computerized locker bank based on the behavior of a plurality of consignees that have previously picked up one or more parcels that were stored at the computerized locker bank; and
   one or more pieces of package level detail information for a plurality of parcels, wherein the one or more pieces of package level detail information comprise, for each respective parcel of the plurality of parcels:
   i. tracking information for the respective parcel; and
   ii. consignee information for the respective parcel comprising consignee parcel retrieval habit data, wherein the consignee information includes at least a home address of the consignee or a business address of the consignee, and wherein the consignee parcel retrieval habit data of the consignee includes one or more of an average length of time that the consignee leaves a parcel in a locker at the particular locker bank before picking up the parcel, typical days of the week on which the consignee retrieves parcels from the locker bank, and particular time windows during which the consignee typically or always retrieves parcels from the locker bank; and
   ii. the one or more processors are configured to:
   selectively operate the one or more locking mechanisms to open the one or more doors;
   determine that at least one of the one or more stored parcels has been retrieved from the computerized locker bank;
   determine that at least one new parcel has been deposited in one of the plurality of selectively securable locker compartments;
   modify the data related to the current inventory of parcels in response to determining that at least one of the one or more stored parcels has been retrieved from the computerized locker bank or at least one new parcel has been deposited in one of the plurality of selectively securable locker compartments to ensure that the data related to the current inventory of parcels is up-to-date;
   receive an indication that delivery of one or more undeliverable parcels is not possible at a primary delivery location from a particular portable computing device of the plurality of portable computing devices via a computer network;
   in response to receiving the indication, reserve a locker at the computerized locker bank for the one or more parcels and modify the second number of the total number of lockers that are reserved for a future delivery of one or more incoming parcels to include the one or more undeliverable parcels;
   determine a first projected number of the one or more stored parcels that are projected to be retrieved from the computerized locker bank by a future time based on 1) the tracking information, 2) the historical parcel retrieval data for the computerized locker bank, 3) the consignee parcel retrieval habit data of one or more consignees having parcels presently stored in one or more lockers at the computerized locker bank, 4) one or more current locations of the one or more consignees having parcels presently stored in one or more lockers at the computerized locker bank;

determine a second projected number of the one or more incoming parcels that are projected to be delivered to the locker bank by the future time based on the tracking information; and generate a virtual inventory of parcels projected to be stored at the computerized locker bank at the future time based on the data related to a current inventory of parcels stored at the computerized locker bank, the determined first projected number, and the determined second projected number.

2. The locker bank inventory management system of claim 1, wherein:
   a. the locker bank inventory management system further comprises a network of a plurality of computerized locker banks;
   b. the computerized locker bank is a particular computerized locker bank in the network of the plurality of computerized locker banks;
   c. the consignee parcel retrieval habit data comprises parcel retrieval habit data selected from a group consisting of:
      i. first parcel retrieval habit data associated with the consignee specific to the particular computerized locker bank; and
      ii. second parcel retrieval habit data associated with the consignee across the network of the plurality of computerized locker banks.

3. The locker bank inventory management system of claim 1, wherein:
   a. the tracking information includes a particular day of a week on which the parcel was delivered to the locker; and
   b. the historical parcel retrieval data comprises data related to a number of days for which a parcel is typically stored based on the particular day of the week on which the parcel is delivered to the computerized locker bank.

4. The locker bank inventory management system of claim 1, wherein:
   a. the tracking information comprises a date on which the one or more stored parcels were delivered to the computerized locker bank;
   b. the historical parcel retrieval data comprises data related to an age-out number of days after which a parcel that has not been retrieved from the computerized locker bank is expected to remain at the computerized locker without being retrieved prior to a parcel retrieval deadline; and
   c. determining a first projected number of the one or more stored parcels that are projected to be retrieved from the computerized locker bank by the future time based on the tracking information, the historical parcel retrieval data, and the consignee parcel retrieval habit data comprises:
      i. determining, for each of the one or more stored parcels, a number of stored days at the future time based on the date on which the one or more stored parcels were delivered to the computerized locker bank; and
      ii. determining which of the one or more stored parcels will have been stored for longer than the age-out number of days at the future time based on the number of stored days for each of the one or more stored parcels.

5. The locker bank inventory management system of claim 1, wherein:
   a. the one or more processors are configured to generate the virtual inventory of parcels projected to be stored at the computerized locker bank at the future time in response to receiving the indication that delivery of the one or more undeliverable parcels is not possible at the primary delivery location from the particular portable computing device of the plurality of portable computing devices via the computer network;
   b. the one or more processors are further configured to determine an estimated delivery time of the one or more undeliverable parcels at the computerized locker bank in response to receiving the indication that delivery of the one or more undeliverable parcels is not possible at the primary delivery location;
   c. the future time is the estimated delivery time; and
   d. the one or more processors are further configured to determine, based on the virtual inventory, whether the computerized locker bank will have one or more lockers that are available to accept delivery of the one or more undeliverable parcels at the estimated delivery time.

6. A computerized locker network comprising:
   a. a plurality of locker banks, each respective locker bank comprising:
      i. one or more locker bank computers comprising one or more processors and memory; and
      ii. one or more selectively securable locker compartments, each selectively securable locker compartment comprising one or more walls that defines a storage space, one or more doors for selectively securing the storage space, and one or more locking mechanisms operatively coupled to the one or more doors, wherein the one or more processors are configured to operate the one or more locking mechanisms to lock and unlock the one or more doors;
   b. a plurality of portable computing devices, each respective portable computing device comprising:
      i. one or more processors; and
      ii. memory; and
   c. one or more remote logistics servers comprising:
      i. one or more processors; and
      ii. memory operatively coupled to the one or more processors, wherein the memory is configured to store package level detail information and tracking information for a plurality of parcels,
   the one or more processors are configured to selectively update the tracking information for the plurality of parcels,
   wherein the package level detail information includes consignee information comprising consignee parcel retrieval habit data, wherein the consignee parcel retrieval habit data of the consignee includes one or more of an average length of time that the consignee leaves a parcel in a locker at the particular locker bank before picking up the parcel, typical days of the week on which the consignee retrieves parcels from the locker bank, and particular time windows during which the consignee typically or always retrieves parcels from the locker bank, and wherein the computerized locker network is configured for:
      i. receiving, at the one or more logistics servers via one or more networks, identifying information for a particular parcel of the one or more parcels from a particular portable computing device of the plurality of portable computing devices following an unsuccessful delivery attempt of the particular parcel at a primary delivery location;
      ii. at least partially based on the received identifying information and package level detail associated with the particular parcel, determining a first locker bank at a secondary location from the plurality of locker banks for the particular parcel;

iii. forecasting, by the computerized locker network, an availability of one or more lockers at the first locker bank for a first particular time in the future based on 1) the tracking information, 2) a historical parcel retrieval data for the computerized locker bank, 3) the consignee parcel retrieval habit data of one or more consignees having parcels presently stored in one or more lockers at the computerized locker bank, and 4) one or more current locations of the one or more consignees having parcels presently stored in one or more lockers at the computerized locker bank, wherein the historical parcel retrieval data for the computerized locker bank is based on the behavior of a plurality of consignees that have previously picked up one or more parcels that were stored at the computerized locker bank; and iv. assigning, by the computerized locker network, the particular parcel to the first locker bank if a locker is forecast to be available at the first particular time.

7. The computerized locker network of claim 6, wherein the particular time is an estimated time that the particular parcel will be delivered to the first locker bank by the carrier.

8. The computerized locker network of claim 6, wherein forecasting an availability of one or more lockers at the first locker bank further comprises:

a. determining, by the computerized locker network, the actual locker inventory at a second particular time that is earlier in time than the first particular time;

b. at least partially based on a predicted behavior of one or more consignees having parcels presently stored in one or more lockers at the first locker bank, forecasting, by the computerized locker network, the availability of one or more lockers at the first particular time.

9. The computerized locker network of claim 8, wherein forecasting an availability of one or more lockers at the first locker bank further comprises:

a. determining, by the computerized locker network, the actual locker inventory at a third particular time, wherein the third particular time occurs after the second particular time, but before the first particular time; and b. updating, by the computerized locker network, the forecast availability of one or more lockers at the first locker bank based at least in part on the actual locker inventory at the third particular time.

10. The computerized locker network of claim 6, wherein forecasting an availability of one or more lockers at the first locker bank further comprises:

a. determining, by the computerized locker network, consignee information for one or more parcels currently stored at the first locker bank;

b. at least partially based on the consignee information for the one or more parcels currently stored at the first locker bank, predicting, by the computerized locker network, a pickup time of one or more of the parcels currently stored at the first locker bank; and c. calculating, by the computerized locker network, a forecasted locker inventory availability at the first particular time based in part on the predicted pickup time of the one or more parcels currently stored at the first locker bank.

11. The computerized locker network of claim 10, wherein determining consignee information for one or more parcels currently stored at the first locker bank further comprises detecting, by the computerized locker network, location information from a portable computing device associated with a consignee having one or more parcels currently stored at the first locker bank.

12. The computerized locker network of claim 11, wherein the computerized locker network is configured for sending pick-up notifications to a consignee based at least in part on the location information associated with the consignee.

13. The computerized locker network of claim 12, wherein the pickup notification allows the consignee to send an electronic confirmation to the computerized locker network indicating whether the consignee will pick-up their parcel prior to the first particular time.

14. The computerized locker network of claim 6, wherein the computerized locker network is configured for:

a. confirming at a second time prior to the first time whether a particular suitable locker is available at the first locker bank;

b. at least partially in response to confirming whether the particular suitable locker is available:

i. assigning, by a processor, the particular parcel to the particular suitable locker at the first locker bank if the particular suitable locker is available;

ii. assigning, by a processor, the particular parcel to an available locker at a second locker bank if the particular suitable locker is not available;

iii. arranging for a portable locker bank to be delivered to the secondary location prior to the first time if the particular suitable locker is not available and assigning the particular parcel to a locker from the portable locker bank; or rescheduling delivery of the particular parcel to the primary delivery location; and iv. notifying the consignee of the status of the parcel.

15. The computerized locker network of claim 14, wherein the computerized locker network is configured for, at least partially in response to confirming whether the particular suitable locker is available, arranging for a portable locker bank to be delivered to the secondary location prior to the first time if the particular suitable locker is not available and assigning the particular parcel to a locker of the portable locker bank.

16. The computerized locker network of claim 15, wherein the portable locker bank further comprises:

a. a self-driving vehicle;

b. at least one processor operatively coupled to the self-driving vehicle; and c. a communication device operatively coupled to the at least one processor, wherein the communication device is configured to receive instructions from the one or more remote logistics servers.

17. The computerized locker network of claim 14, wherein the step of forecasting, by the computerized locker network, an availability of one or more lockers at the first locker bank for a first particular time in the future comprises forecasting an availability of one or more lockers at the first locker bank during a particular time window.

18. A computer-implemented method for directing one or more parcels to a suitable alternate delivery location, the method comprising:

a. forecasting, by a processor, whether the alternate delivery location has capacity at a first time for accepting the one or more parcels based at least in part on 1) tracking information for a plurality of parcels, 2) a historical parcel retrieval data for the alternate delivery location, and 3) one or more current locations of the one or more consignees having parcels presently stored at the alternate delivery location, and one or more second pieces of information selected from a second group consisting of:
i. consignee information associated with one or more parcels currently at the alternate delivery location, wherein the consignee information comprises consignee parcel retrieval habit data, wherein the consignee parcel retrieval habit data includes one or more of an average length of time that the consignee leaves a parcel in a locker at the particular locker bank before picking up the parcel, typical days of the week on which the consignee retrieves parcels from the locker bank, and particular time windows during which the consignee typically or always retrieves parcels from the locker bank;
ii. a pick-up time of one or more parcels previously stored at the alternate delivery location;
iii. an average length of time that one or more parcels are left at the alternate delivery location prior to being picked up;
iv. a number of total available storage spaces at the alternate delivery location; and
v. the size of the storage spaces available in the alternate delivery location;
wherein the historical parcel retrieval data for the alternate delivery location is based on the behavior of a plurality of consignees that have previously picked up one or more parcels that were stored at the alternate delivery location; and
b. at least partially in response to forecasting storage availability at a first time for the alternate delivery location, assigning the one or more parcels to the alternate delivery location.

19. The computer-implemented method of claim 18, further comprising the steps of:
a. confirming, by a processor, whether the alternate delivery location has capacity at a second time prior to the first time;
b. at least partially in response to confirming whether capacity is available:
i. assigning, by a processor, the one or more parcels to the alternate delivery location;
ii. assigning, by a processor, the one or more parcels to a second alternate delivery location;
iii. arranging, by a processor, for a portable locker bank to be delivered to the alternate delivery location prior to the first time and assigning, by a processor, the one or more parcels to a locker from the portable second locker bank; or
iv. rescheduling delivery of the one or more parcels to the alternate delivery location on a different day; and
c. notifying the consignee of the status of the parcel.

20. The computer-implemented method of claim 18, wherein forecasting storage capacity at a first time for the alternate delivery location further comprises:
a. determining, by a processor, consignee information associated with one or more parcels currently at the alternate delivery location;
b. at least partially based on the consignee information associated with the one or more parcels, forecasting, by a processor, the likelihood that the one or more parcels currently at the alternate delivery location will be picked up by the consignee prior to the first time; and
c. creating, by a processor, a virtual inventory for the alternate delivery location at the first time at least partially based on the forecast likelihood that the one or more parcels will be picked up by the consignee prior to the first time.

21. The computer-implemented method of claim 20, wherein consignee information comprises receiving location information for the consignee at a time prior to the first time, the method further comprising updating the forecast of locker availability at the first time at least partially based on the received location information.

* * * * *